United States Patent [19]
Pyo

[11] Patent Number: 5,982,135
[45] Date of Patent: Nov. 9, 1999

[54] APPARATUS FOR SENSING POSITION OF A SWITCHED RELUCTANCE MOTOR HAVING POSITION COMPENSATION FUNCTION FOR A ROTOR

[75] Inventor: Sang-yeon Pyo, Kyungki-do, Rep. of Korea

[73] Assignee: Samsung Electronics Co., Ltd., Suwon, Rep. of Korea

[21] Appl. No.: 09/042,991

[22] Filed: Mar. 17, 1998

[30] Foreign Application Priority Data

Mar. 18, 1997 [KR] Rep. of Korea .................... 97-5018 U

[51] Int. Cl.⁶ ..................................................... H02P 7/00
[52] U.S. Cl. ............................................. 318/701; 348/439
[58] Field of Search .................................. 318/701, 254, 318/439, 138

[56] References Cited

U.S. PATENT DOCUMENTS

| | | | |
|---|---|---|---|
| 4,024,446 | 5/1977 | Burnett | 318/685 |
| 4,118,129 | 10/1978 | Grundherr | 400/144.2 |
| 4,319,134 | 3/1982 | Weber | 250/231 |
| 4,767,925 | 8/1988 | Kawamoto | 250/231 |
| 4,862,594 | 9/1989 | Schierbeek et al. | 33/356 |
| 4,878,135 | 10/1989 | Makino et al. | 360/78.04 |
| 5,150,115 | 9/1992 | deJong et al. | 340/870.31 |
| 5,576,905 | 11/1996 | Garcia et al. | 360/73.14 |

*Primary Examiner*—Jonathan Salata
*Attorney, Agent, or Firm*—Burns, Doane, Swecker & Mathis, L.L.P.

[57] ABSTRACT

An apparatus for sensing the position of a switched reluctance motor (SRM) is provided, which detects a relative position of a rotor through concentric slit groups formed along different concentric circumferences of a sensor plate and compensates the position of the rotor through a compensating slit which is formed on the sensor plate, thereby effectively preventing the distortion of the position detection pulse from being accumulated and spread by restricting bad influences caused by the distortion of the position detection pulse generated by partial reasons to a relevant position. As a result, since it is possible to prevent the distortion of the position detection pulse from being accumulated and spread by restricting bad influences caused by the distortion of the position detection pulse generated by partial reasons to the relevant position, the rotating torque ripple and noise can be reduced, thereby maximizing the efficiency of the SRM.

9 Claims, 3 Drawing Sheets

FIG. 1
*(CONVENTIONAL)*
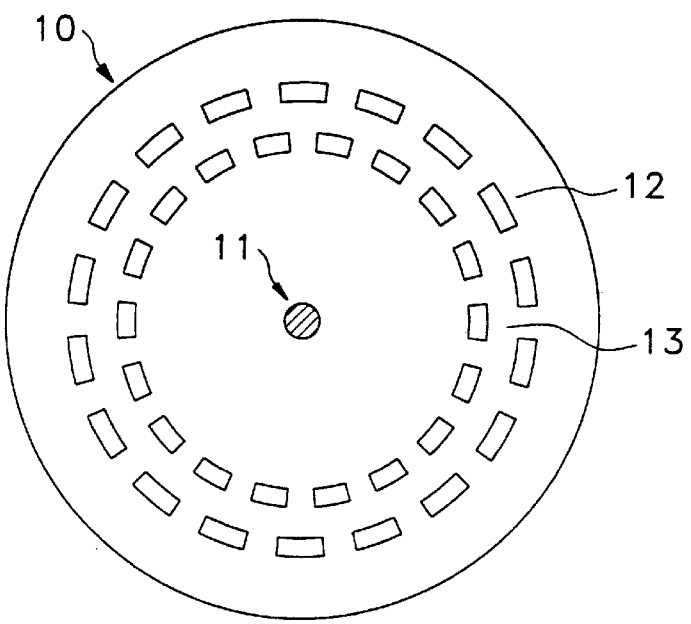
FIG. 2
*(CONVENTIONAL)*
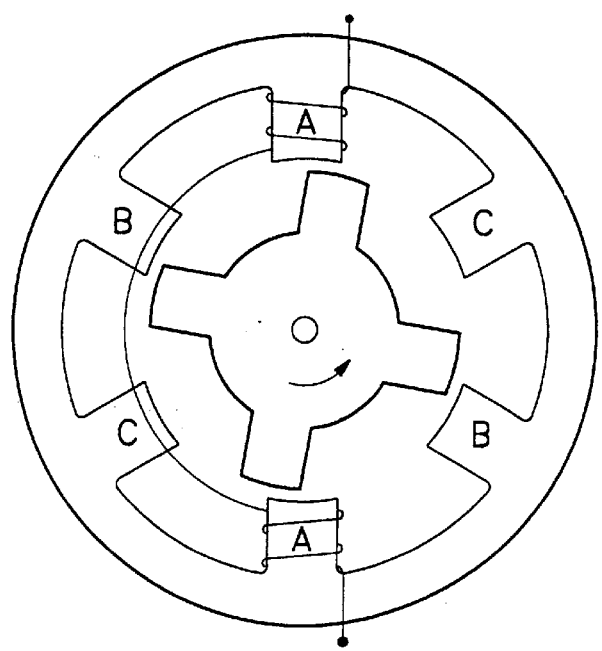

FIG. 3
(CONVENTIONAL)
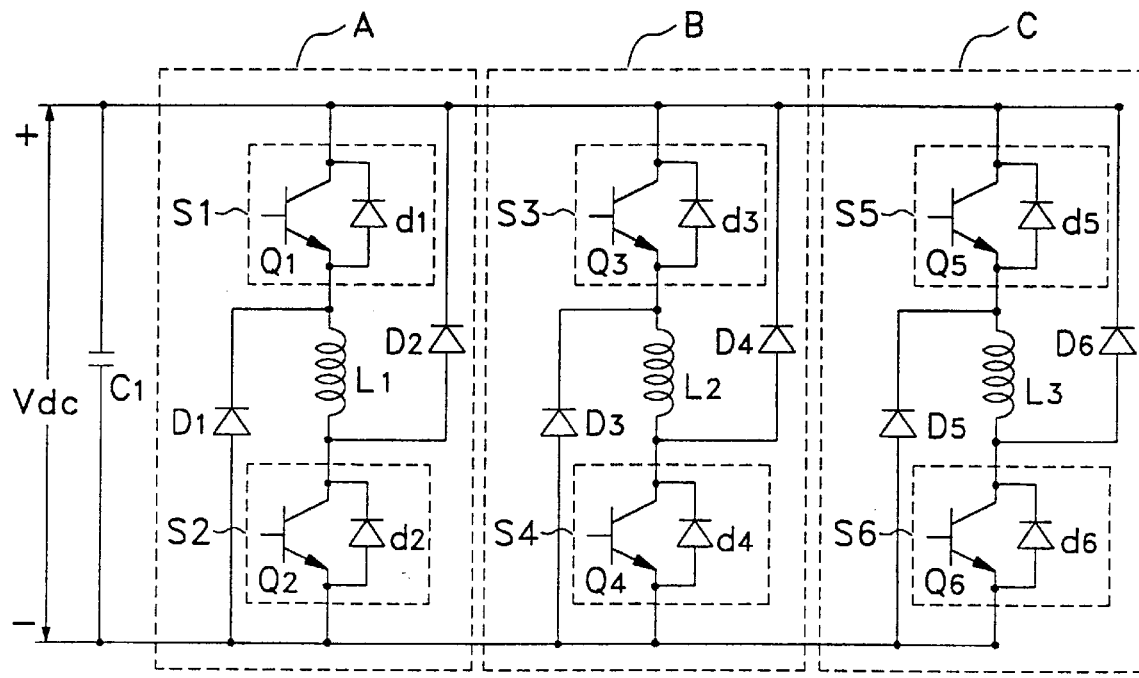

APPARATUS FOR SENSING POSITION OF A SWITCHED RELUCTANCE MOTOR HAVING POSITION COMPENSATION FUNCTION FOR A ROTOR

This application claims priority under 35 U.S.C. §§119 and/or 365 to Utility Model Application No. 97-5018 filed in Korea on Mar. 18, 1997; the entire content of which is hereby incorporated by reference.

BACKGROUND OF THE INVENTION

1. Field of the Invention

The present invention relates to an apparatus for sensing the position of a switched reluctance motor (SRM), and more particularly to an apparatus for sensing the position of a switched reluctance motor (SRM) which detects a relative position of a rotor through concentric slit groups formed along different concentric circumferences of a sensor plate and compensates the position of the rotor through a compensating slit which is formed on the sensor plate.

2. Description of the Related Art

Generally, a switched reluctance motor (SRM) is a kind of a reluctance motor which mainly includes: a polyphase stator which generates a magnetic force by binding an armature coil; a rotor which is rotated by a magnetic attractive force generated according to relative positions of a tooth and the magnetic force generated by the stator; and a position detecting unit which has a position detection sensing unit and a sensor plate and detects the position of the rotor by sensing a position detection pulse by a predetermined angle resolution as the position of the rotor varies. Here, a plurality of teeth are symmetrically formed at the rotor, and the armature coil symmetrically binds each of the polyphase stator. The position detection sensing unit outputs the position detection pulse by detecting the position of the rotor and synchronizes with the position detection pulse, thereby successively driving the polyphase armature coils.

The power supplied to the armature coil which is bound to the polyphase stator is controlled by a switching element. At this time, by successively varying the excitation state between the rotor and the stator as the input pulse signal is applied to a control terminal of the switching element by synchronizing with the position detection pulse of the position detecting unit, a forward rotating torque corresponding to the input pulse signal can be generated at the rotor by the magnetic attractive force. Moreover, in the case that a specific excitation state is not varied, it is possible to stop the rotor at a predetermined position. In addition, by controlling the phase of the inputted pulse signal which is applied to the switching element based on the position where the inductance reaches at its maximum, an inverse rotating force can be generated. As described above, it is possible to widely apply the control operation in the various directions to the washing machine, etc.

At this time, to successively vary the excitation state of each phase, it is essential to sense the position of the rotor.

There are many prior arts which have been disclosed relating to the SRM, such as U.S. Pat. No. 4,748,387, "DC brushless motor driving method and apparatus for accurately controlling starting position of rotor" patented on May 1988; U.S. Pat. No. 4,990,843, "Reluctance motor" patented on February 1991; U.S. Pat. No. 5,111,095,"Polyphase switched reluctance motor" patented on May 1992; U.S. Pat. No. 5,461, 295,"Noise reduction in a switched reluctance motor by current profile manipulation" patented on October 1995; and U.S. Pat. No. 5,539,293, "Rotor position encoder having features in decodable angular position" patented on July 1996.

FIG. 1 is a view illustrating the structure of the sensor plate for sensing the position of the rotor in the conventional SRM. As shown in the drawing, at the sensor plate 10, there are a first concentric slit group 12 having a plurality of slits which are perforated to have a predetermined angle resolution along the concentric circumference having a first radius, centering around the rotary shaft 11 of the rotor; and a second concentric slit group 13 having a plurality of slits which are perforated to have a predetermined angle resolution along the concentric circumference having a second radius smaller than the first radius, centering around the rotary shaft 11 of the rotor. Generally, slits forming the first concentric slit group 12 and the second concentric slit group 13 are misaligned each other. As the sensor plate 10 is located at the upper end of the rotary shaft 11 of the rotor, it is rotated together with the rotor when the rotor of the motor is rotated. Here, the reason the slit groups each having a plurality of slits are used is to enhance the angle resolution for sensing the position of the rotor.

The apparatus for sensing the position of the conventional SRM includes the sensor plate 10 and the position detection sensing unit which senses the position of the rotor through the position detection pulse which is discretely generated by the light which optically penetrates the slits formed through the sensor plate 10.

To detect the position detection pulse, the SRM includes the position detection sensing unit which is an optical sensor having a light emitting element (not illustrated) and a light receiving element (not illustrated) therein. The light emitted from the light emitting element is discretely incident upon the light receiving element by penetrating the slits of the sensor plate 10 as the sensor plate 10 rotates along with the rotor. At this time, the light receiving element generates and outputs a predetermined position detection pulse.

A microcomputer (not illustrated) presumes the position of the rotor by receiving the position detection pulse which is outputted from the position detection sensing unit. After that, by controlling the phase of the inputted pulse signal which is applied to a control terminal of a switching unit of a motor driving unit, the microcomputer can rotate the rotor forward and inversely or stops the rotor at a specific position.

In the case that the position detection sensing unit of the conventional SRM includes a single position sensor, as it is difficult to fully obtain the information on the position of the rotor which is necessary for multiphase control, the SRM generally uses a plurality of position detection sensing units.

As described above, when the position detection sensing unit for detecting the position of the rotor outputs the position detection pulse by a predetermined angle resolution as the position of the rotor varies, the position where the armature coil is turned on is synchronized with the position detection pulse. At this time, the time when each armature coil is turned on influences decisively on the function of the SRM.

However, in the case of the apparatus for sensing the position of the conventional SRM, when the position detection pulse detected from the first concentric slit group 12 and the second concentric slit group 13 is distorted or becomes irregular or this distortion is accumulated, it causes bad influences on the operation of the SRM.

In other words, the distortion of the position detection pulse causes large rotating torque ripple relatively. In addition, it declines the rotating torque and causes noise. As a result, it declines the efficiency of the SRM.

SUMMARY OF THE INVENTION

Therefore, it is an object of the present invention to provide an apparatus for sensing the position of a switched reluctance motor (SRM) which detects a relative position of a rotor through concentric slit groups formed along different concentric circumferences of a sensor plate and compensates the position of the rotor through a compensating slit which is formed on the sensor plate, thereby effectively preventing the distortion of the position detection pulse from being accumulated and spread by restricting bad influences caused by the distortion of the position detection pulse generated by partial reasons to a relevant position.

To achieve the above object, the apparatus for sensing the position of the SRM having a switching control unit for switching variably the excitation state of each phase of the stator according to the relevant position of the rotor to the polyphase stator includes: a sensor plate; a position detection sensing unit; a position compensation sensing unit and a position detection compensating unit. Here, the sensor plate through which one concentric slit group having a plurality of slits penetrated to have a predetermined angle resolution along the concentric circumference is misaligned with at least one slit group having a plurality of slits formed along a different concentric circumference. In addition a compensating slit for compensating the position of the rotor is located at one point of a different concentric circumference of the sensor plate. As the position detection sensing unit is rotated as the sensor plate is attached to a rotary shaft of the rotor, the position detection pulse discretely generated by the light which optically penetrates each slit of the concentric slit groups. As the position compensation sensing unit senses a position compensation pulse discretely generated by the light which penetrates optically the compensating slit, the position detection compensating unit detects the position of the rotor by receiving the position detection pulse and compensates the position of the rotor based on the position where the position compensation pulse is sensed per a predetermined rotating cycle. After that, the compensated position is supplied to the switching control unit, thereby maximizing the efficiency of the SRM.

BRIEF DESCRIPTION OF THE DRAWINGS

A more complete appreciation of the present invention, and may of the attendant advantages thereof, will become readily apparent as the same becomes better understood by reference to the following detailed description when considered in conjunction with the accompanying drawings in which like reference symbols indicate the same or similar components, wherein:

FIG. 1 is a view illustrating the structure of a sensor plate for sensing the position of a rotor in a conventional switched reluctance motor (SRM);

FIG. 2 is a view illustrating the inner structure of the conventional SRM:

FIG. 3 is a circuit diagram illustrating a part of a driving circuit unit of a SRM having three phases;

DETAILED DESCRIPTION OF THE PREFERRED EMBODIMENTS

Figure 4:
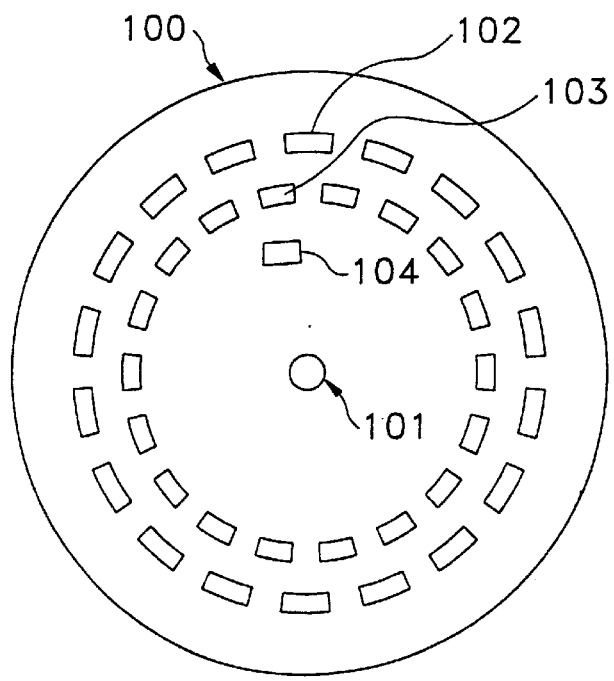
FIG. 4 is a view illustrating a sensor plate of a SRM according to the present invention.

The objects, characteristics and advantages of the above-described invention will be more clearly understood through the preferable embodiments referring to the attached drawings.

For easy understanding of an apparatus for sensing the position of a switched reluctance motor (SRM) according to the present invention, the overall structure of the conventional SRM is firstly explained as follows.

FIG. 2 is an example illustrating the inner structure of the conventional SRM. The SRM equipped with a stator having three phases of A, B and C. As shown in the drawing, the conventional SRM is manufactured to have polyphase and controls the phase of the current applied to an armature coil of each phase. The SRM can rotate the rotor forward and inversely by a magnetic attractive force generated according to the rotor and its relative position.

FIG. 3 is a circuit diagram illustrating a part of a driving circuit unit of the SRM having three phases. As shown in the drawing, the driving circuit unit of the conventional SRM having three phases includes a first driving unit A for providing the rotor with the magnetic force proportioned to the magnetic flux of a first phase as a switching element is turned on by an inputted pulse signal; a second driving unit B for providing the rotor with the magnetic force proportioned to the magnetic flux of a second phase as the switching element is turned on by the inputted pulse signal; and a third driving unit C for providing the rotor with the magnetic force proportioned to the magnetic flux of a third phase as the switching element is turned on by the inputted pulse signal. Here, the first driving unit A includes: a first armature coil L1 for generating the magnetic flux of the first phase; a first switching unit S1 having a first transistor Q1 which is connected to one end of the first armature coil L1 and controls the supplied power according to the inputted pulse signal which is inputted through the control terminal, and a first diode d1 for protecting the first transistor Q1 from the counter-electromotive force generated from the first armature coil L1 when the first transistor Q1 is turned on/off; a second switching unit S2 having a second transistor Q2 which is connected to the other end of the first armature coil L1 and controls the supplied power according to the inputted pulse signal which is inputted through the control terminal, and a second diode d2 for protecting the second transistor Q2 from the counter-electromotive force generated from the first armature coil L1 when the second transistor Q2 is turned on/off; a first current feedback diode D1 which is connected to one end of the first armature coil L1 and feeds back the current; and a second current feed back diode D2 which is connected to the other end of the first armature coil L1 and feeds back the current. Each of the second and third phase driving units B and C has the same structure as the first phase driving unit A.

It is essential to sense the position of the rotor in order to successively operate the first phase driving unit A, the second phase driving unit B and the third phase driving unit C within the maximum top limit of the inductance of each phase, in the forward rotating direction. The switching control unit switches the voltage states of the first, second and third phase driving units A, B and C based on the information about the relative position of the rotor to the polyphase stator. As a result, by varying the excitation state of the each phase of the stator, it is possible to rotate the rotor of the SRM to the desired direction.

As described above, since the accuracy of the information on the relative position of the rotor to the polyphase of the stator is an essential parameter which decides the operation characteristic of the SRM, the apparatus for sensing the position of the SRM is provided to prevent the distortion of the information on the position of the rotor and the accumulation of the distorted information.

Figure 5:
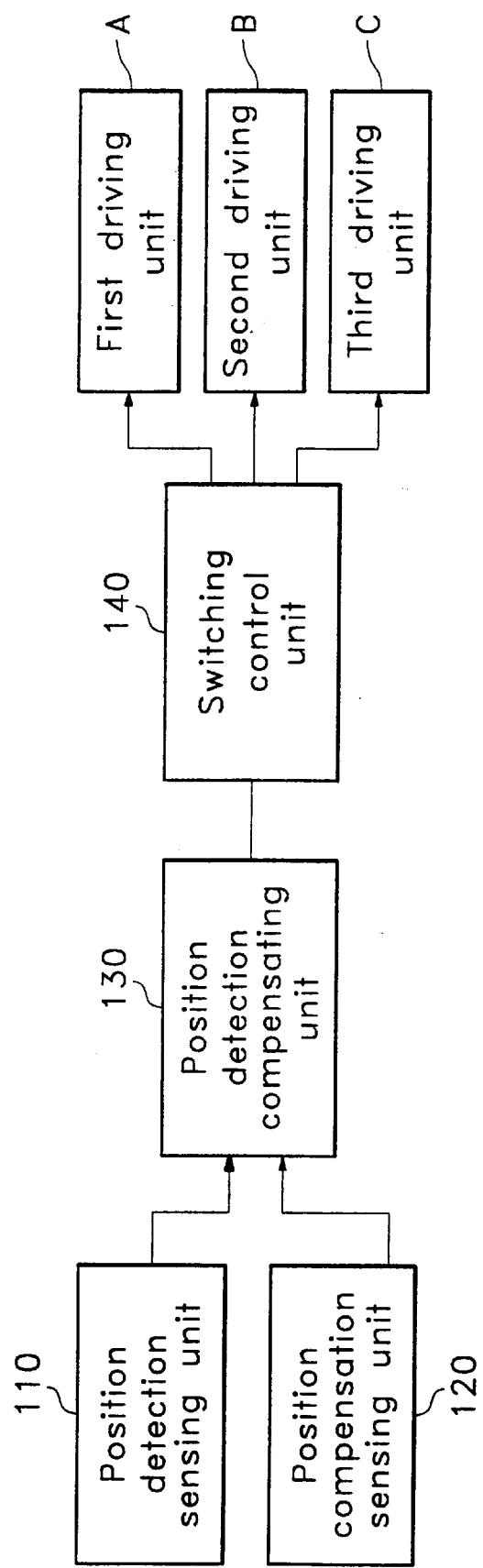
FIG. 5 is a block diagram illustrating a preferred embodiment of an apparatus for sensing the position of the SRM according to the present invention.

FIG. 4 is a view illustrating the sensor plate of the SRM; and FIG. 5 is a block diagram illustrating a preferred embodiment of the apparatus for sensing the position of the SRM according to the present invention.

In the preferred embodiment of the present invention, the apparatus for sensing the position of the SRM includes a sensor plate through which one concentric slit group having a plurality of slits penetrated to have a predetermined angle resolution along the concentric circumference is misaligned with at least one slit group having a plurality of slits formed along a different concentric circumference. In addition, a compensating slit for compensating the position of the rotor is located at one point of a different concentric circumference of the sensor plate.

FIG. 4 is a view illustrating two concentric slit groups. As shown in the drawing, at the sensor plate 10, there are a first concentric slit group 102 having a plurality of slits which are perforated to have a predetermined angle resolution along the concentric circumference having a first radius, centering around the rotary shaft 101 of the rotor; a second concentric slit group 103 having a plurality of slits which are perforated to have a predetermined angle resolution along the concentric circumference having a second radius smaller than the first radius, centering around the rotary shaft 101 of the rotor; and a compensating slit 104 for compensating the position of the rotor at one point on a different concentric circumference having a third radius centering around the rotary shaft 101 of the rotor. As usual, the slits constituting the first concentric slit group 102 and the second concentric slit group 103 are misaligned each other.

Here, the reason the slit groups each having a plurality of slits are used is to enhance the angle resolution for sensing the position of the rotor. As in the conventional SRM, since the sensor plate 100 is located at the upper end of the rotary shaft 101 of the rotor, it is rotated together with the rotor when the rotor of the motor is rotated.

As the sensor plate 100 is connected to the rotary shaft 101 of the rotor and then rotated, the position detection sensing unit 110 senses the position detection pulse generated discretely by the light which penetrates optically the slits of the first and second concentric slit groups 102 and 103.

In the preferred embodiment of the present invention, two concentric slit groups are suggested. However, at least one concentric slit group formed through the sensor plate 100 is sufficient. Too many concentric slit groups make the system complicated and they does not contribute to enhance the actual angle resolution. Accordingly, it is proper to decide the number of the concentric slit group, considering the application field of the SRM, the technical level, the intended accuracy and the cost for designing the SRM.

Moreover, the number of slits which are penetrated along the concentric circumference and form the concentric slit groups can be decided according to the intended angle resolution, and the penetrated positions are decided in accordance with the aim for design.

The position compensation sensing unit 120 senses the position compensation pulse generated discretely by the light which penetrates optically the compensating slit 104.

In the preferred embodiment of the present invention, there is provided only one compensating slit 104 which is located at any point on the concentric circumference having a third radius centering around the rotary shaft 101 of the rotor. However, to set a plurality of compensating slits is also possible. By penetrating another compensating slit at any point on the concentric circumference having a fourth radius centering around the rotary shaft 101 of the rotor and further including the position compensation sensing unit, it is possible to enhance the resolution for compensating the position. Here, the third radius and fourth radius can be larger or smaller than the first radius and second radius. Or, they can be larger than the second radius and smaller than the first radius.

After that, the position detection compensating unit 130 receives the position detection pulse from the position detection sensing unit 110 and detects the position of the rotor. Moreover, the position detection compensating unit 130 receives the position compensation pulse from the position compensation sensing unit 120 and then compensates the position of the rotor based on the position where the position compensation pulse is sensed per a predetermined period of the rotor, thereby supplying the compensated position information to the switching control unit 140.

As the position information of the compensated rotor is received from the position detection compensating unit 130, the switching control unit 140 switches the voltage states of the first, second and third driving units A, B and C of FIG. 3 based on the information on the relative position of the rotor to the polyphase stator. As a result, by varying the excitation state of the each phase of the stator, the rotor of the SRM can be rotated to a desired direction.

As the terms mentioned later are determined based upon the function of the present invention and they can be changed according to the technician's intention or a usual practice, the terms should be determined considering the overall contents of the specification of the present invention.

As described above, the apparatus for sensing the position of the SRM having the switching control unit for switching variably the excitation state of each phase of the stator according to the relevant position of the rotor to the polyphase stator includes the sensor plate, the position detection sensing unit, the position compensation sensing unit and the position detection compensating unit. Here, the sensor plate through which one concentric slit group having a plurality of slits penetrated to have a predetermined angle resolution along the concentric circumference is misaligned with at least one slit group having a plurality of slits formed along a different concentric circumference. In addition, a compensating slit for compensating the position of the rotor is located at one point of a different concentric circumference of the sensor plate. As the position detection sensing unit is rotated as the sensor plate is attached to the rotary shaft of the rotor, the position detection pulse discretely generated by the light which optically penetrates each slit of the concentric slit groups. As the position compensation sensing unit senses a position compensation pulse discretely generated by the light which penetrates optically the compensating slit, the position detection compensating unit detects the position of the rotor by receiving the position detection pulse and compensates the position of the rotor based on the position where the position compensation pulse is sensed per a predetermined rotating cycle. After that, the compensated position is supplied to the switching control unit. As a result, since it is possible to prevent the distortion of the position detection pulse from being accumulated and spread by restricting bad influences caused by the distortion of the position detection pulse generated by partial reasons to a relevant position, the rotating torque ripple and noise can be reduced, thereby maximizing the efficiency of the SRM.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for sensing the position of a switched reluctance motor (SRM) having a switching control unit for variably switching the excitation state of each phase of a stator according to the relevant position of a rotor to the polyphase stator, said apparatus comprising:

a sensor plate including at least two concentric slit groups, one concentric slit group having a plurality of slits having a predetermined angle resolution along the concentric circumference which is misaligned with at least one other slit group having a plurality of slits formed along a different concentric circumference, and, a compensating slit for compensating the position of said the rotor located at one point of a different concentric circumference, wherein said sensor plate is attached to a rotary shaft of said rotor to rotate with said rotary shaft;

a position detection sensing unit for sensing a position detection pulse discretely generated by light which optically penetrates the slits of said concentric slit groups;

a position compensation sensing unit for sensing a position compensation pulse discretely generated by the light which optically penetrates said compensating slit; and a position detection compensating unit for detecting the position of the rotor by receiving said position detection pulse, compensating the position of said rotor based on the position where said position compensation pulse is sensed per a predetermined rotating cycle of said rotor, and then supplying the compensated position information to said switching control unit.

2. The apparatus of claim 1, wherein said sensor plate comprises:

a first concentric slit group having a plurality of slits which have a predetermined angle resolution along the concentric circumference having a first radius centered on the rotary shaft of said rotor;

a second concentric slit group having a plurality of slits which have a predetermined angle resolution along the concentric circumference having a second radius smaller than said first radius centered on the rotary shaft of said rotor; and a compensating slit for compensating the position of said rotor at one point on a different concentric circumference having a third radius centered on the rotary shaft of said rotor.

3. The apparatus of claim 1, wherein said predetermined rotating cycle is one (1).

4. A switched reluctance motor (SRM) comprising:

a switching control unit for variably switching the excitation state of each phase of a stator according to the relevant position of a rotor to the polyphase stator;

a sensor plate having at least two concentric slit groups, one concentric slit group having a plurality of slits having a predetermined angle resolution along the concentric circumference which is misaligned with at least one other slit group having a plurality of slits formed along a different concentric circumference, and a compensating slit for compensating the position of said the rotor located at one point of a different concentric circumference, wherein said sensor plate is attached to a rotary shaft of said rotor to rotate with said rotary shaft;

a position detection sensing unit for sensing a position detection pulse discretely generated by light which optically penetrates the slits of said concentric slit groups, as said sensor plate is attached to a rotary shaft of said rotor to rotate with said rotary shaft;

a position compensation sensing unit for sensing a position compensation pulse discretely generated by the light which optically penetrates said compensating slit; and a position detection compensating unit for detecting the position of the rotor by receiving said position detection pulse, compensating the position of said rotor based on the position where said position compensation pulse is sensed per a predetermined rotating cycle of said rotor, and then supplying the compensated position information to said switching control unit.

5. The switched reluctance motor of claim 4, wherein said sensor plate comprises:

a first concentric slit group having a plurality of slits which have a predetermined angle resolution along the concentric circumference having a first radius centered on the rotary shaft of said rotor;

a second concentric slit group having a plurality of slits which have a predetermined angle resolution along the concentric circumference having a second radius smaller than said first radius centered on the rotary shaft of said rotor; and a compensating slit for compensating the position of said rotor at one point on a different concentric circumference having a third radius centered on the rotary shaft of said rotor.

6. The switched reluctance motor of claim 4, wherein said predetermined rotating cycle is one (1).

7. A position sensor comprising:

a sensor plate having at least two concentric slit groups, one concentric slit group having a plurality of slits having a predetermined angle resolution along the concentric circumference which is misaligned with at least one other slit group having a plurality of slits formed along a different concentric circumference, and a compensating slit for compensating the position of the sensor plate is located at one point of a different concentric circumference;

a position detection sensing unit for sensing a position detection pulse discretely generated by light which optically penetrates the slits of said concentric slit groups;

a position compensation sensing unit for sensing a position compensation pulse discretely generated by the light which optically penetrates said compensating slit; and a position detection compensating unit for detecting the position of the sensor plate by receiving said position detection pulse, compensating the position of said sensor plate based on the position where said position compensation pulse is sensed per a predetermined rotating cycle of said sensor plate.

8. The position sensor of claim 7, wherein said sensor plate comprises:
   a first concentric slit group having a plurality of slits which have a predetermined angle resolution along the concentric circumference having a first radius centered on the center of said sensor plate;
   a second concentric slit group having a plurality of slits which have a predetermined angle resolution along the concentric circumference having a second radius smaller than said first radius centered on said center of said sensor plate; and
   a compensating slit for compensating the position of said sensor plate at one point on a different concentric circumference having a third radius centered on said center of said sensor plate.

9. The position sensor of claim 7, wherein said predetermined rotating cycle is one (1).

* * * * *